United States Patent [19]

Robertson

[11] Patent Number: 4,504,313

[45] Date of Patent: Mar. 12, 1985

[54] POLYAMINES AND POLYOLS CONTAINING A POLYSILOXANE INTERNAL MOLD RELEASE AGENT FOR USE IN PREPARING POLYURETHANE AND POLYUREA RESINS

[75] Inventor: John R. Robertson, Glenn Mills, Pa.

[73] Assignee: ICI Americas Inc., Wilmington, Del.

[21] Appl. No.: 577,296

[22] Filed: Feb. 6, 1984

Related U.S. Application Data

[63] Continuation-in-part of Ser. No. 484,538, Apr. 13, 1983, abandoned.

[51] Int. Cl.$^3$ .............................................. B28B 7/36
[52] U.S. Cl. .................................... 106/38.2; 524/262; 524/265; 524/267; 528/28; 528/29; 264/338; 264/300; 264/328.2
[58] Field of Search ............... 106/38.2; 524/262, 265, 524/267; 528/28, 29; 264/328, 338, 300

[56] References Cited

U.S. PATENT DOCUMENTS

| | | | |
|---|---|---|---|
| 3,993,606 | 11/1976 | Bonin et al. | 264/300 |
| 4,024,090 | 5/1977 | Bonin et al. | 264/300 |
| 4,457,887 | 7/1984 | Porsche | 528/49 |

FOREIGN PATENT DOCUMENTS 117524  7/1982  Japan ..................................... 528/28

Primary Examiner—Melvyn I. Marquis
Attorney, Agent, or Firm—Richard A. Rowe

[57] ABSTRACT

Blends of polyols and polyamines containing internal mold release agents consisting of certain polysiloxanes having pendant organic groups which have functional hydroxyl, amino or mercapto groups are useful in preparing mold releasable resin moldings when made by the reaction injection molding technique.

27 Claims, No Drawings

POLYAMINES AND POLYOLS CONTAINING A POLYSILOXANE INTERNAL MOLD RELEASE AGENT FOR USE IN PREPARING POLYURETHANE AND POLYUREA RESINS

This is a continuation-in-part of U.S. Ser. No. 06/484,538 filed Apr. 13, 1983 and now abandoned.

This invention relates to liquid organic polyol and polyamine blends containing polysiloxane internal mold release agents for use in preparing reaction injected polyurethanes, polyureas and polyurethaneureas having improved mold release properties. In particular the invention is directed to liquid blends wherein at least one polyol or polyamine having from 2-6 isocyanate reactive groups and a molecular weight of from 1,000 to 10,000 has dispersed therein a polysiloxane derivative with pendant organic groups having functional hydroxyl, amino or mercapto groups.

These liquid blends are especially useful in manufacturing shaped resin components by the reaction injection molding process (RIM) wherein a polyol or polyamine stream of the invention which may also contain catalysts, fillers and stabilizers is impingement mixed with at least one other stream containing a liquid polyisocyanate.

The preparation of molded articles by the RIM process is an established and growing industry, especially in the automotive industry. Soft fascia and/or bumper covers are used on more than 60% of cars manufactured today and the usage is growing. As the use grows, however, economics of scale make other processes, such as injection molding, become more competitive, even for larger parts such as automotive fascia. It is therefore necessary to make the already efficient RIM process even faster and more economical to operate and one of the areas in which this can be carried out most effectively is in the reduction or elimination of the need for application of mold release agent to the mold before each part is made.

Recent developments in the chemistry of the polymer systems have resulted in urethane and urethane-urea polymers which are sufficiently cured to be demolded within 20-30 seconds after injection. RIM equipment has improved so that the mechanics of opening and closing the mold also require only 30-40 seconds. Urethane polymers are excellent adhesives and bond tenaciously to metal so it is necessary to apply a release agent to the mold surface so that the parts can be easily and quickly removed without damage or distortion. The molds are complex and must be completely and uniformly covered, usually by spraying a solution or emulsion of soap or wax. This procedure requires 30-60 seconds and must be done at least after every 3-5 parts and more often after each part, thus increasing the part to part cycle time by as much as 50%. In addition, this constant spraying and respraying causes excessive mold release to build up on the areas immediately surrounding the mold surface and on areas where release is relatively easy, so that some release agent is left on the mold surface, as well as areas where excess release agent is inadvertently applied, excessive release agent builds up on the mold surface causing "scumming" and loss of gloss of the molded part. This means that periodically the mold must be wiped off, to remove excess release agent and, about once every 150 to 200 parts, must be completely cleaned, by solvent or detergent wash, wiped down, and the surface reprepared for molding. This can consume more than one hour per shift and thus add another 20 seconds or 10-20% of the time required to mold each part. Furthermore, the external release agent is, obviously, removed from the mold because it adheres to the molded part and must be washed off the part before it is painted, thus providing a possible source for part quality problems.

Clearly, the elimination or reduction of the need to apply external release agent could reduce the present cycle time by 50% or more, thus increasing productivity and reducing unit cost. In addition, it would reduce quality problems by reducing surface blemishes resulting from build up of release agent on the mold and by reducing paint rejects by reducing the amount of external release agent left on the surface of each part.

While the internal mold release agent dispersions of this invention can provide easy removal from an untreated mold surface at least for several parts in some formulations, more efficient operation can be achieved by treating the mold surface with a standard release agent first and then again after about 10 to about 50 parts, depending on the urethane polymer in which it is employed as well as the part complexity, are made. The external agent is then reapplied and 10 to about 50 parts are again made, and so forth. The cycle time per part is thus dramatically reduced and, since less frequent applications of external release agent is required, the frequency of minor and major mold cleaning is also markedly decreased. In addition quality problems due to build up of release agent on the mold and transfer of release agent to the part are reduced. Thus the total production of high quality parts during a given time period is again increased.

An object of the invention is to provide an improved polyamine or polyol dispersion which contains a polysiloxane mold release compound having pendant organic chains which have at least one functional hydroxyl, amino or mercapto group. Another object of the invention is to provide a RIM process for making poly-urethane or polyurea moldings wherein the unit time per molding is decreased by using the polyol or polyamine containing the internal mold release for reaction with polyisocyanates, catalysts and other reactive ingredients.

These and other objects in the invention are accomplished by forming a dispersion of polysiloxane mold release agent in at least one reactive polyol or polyamine having a molecular weight ranging from 1000-10,000 in sufficient proportions such that when mixed with isocyanate the mol ratio of the active hydrogen in the active hydrogen containing functional groups to isocyanate groups in the polyisocyanate range from 0.8-1.2. The concentration of the polysiloxane mold release agent in the blend should be such that the cured resin made therefrom contains from 0.25-5 percent by weight of the polysiloxane ingredient and preferably from about 0.5-2 percent by weight. Therefore, the blend will contain from 0.5-8.0 percent by weight of the polysiloxane mold release agent in most applications. More or slightly less may perform well in some instances.

The exact polyol or polyamine or mixture thereof employed in the "B" component depends upon the end use of the resin product to be produced. For example, when polyurethane foams are prepared the molecular weight or the hydroxyl number is selected to result in flexible or semiflexible foams. The polyols in this instance preferably possess a hydroxyl number of from about 50 to about 150 for semiflexible foams and from about 20 to about 70 for flexible foams. As a further example, for elastomer applications it would generally be desirable to utilize high molecular weight polyols having relatively low hydroxyl numbers for example 20–50 or so. Such limits are not intended to be restrictive but are merely illustrative of the large number of possible combinations of the polyol or polyols used. The relatively high molecular weight hydroxyl-containing polyols which can be employed herein are those polyether and polyester polyols which have an average hydroxyl functionality of from 2 to 6, preferably from 2 to 4 and most preferably from 2 to 3 and an average hydroxyl equivalent weight of from 500 to 5000, preferably from 1000 to 3000 and most preferably from 1500 to 2500 including mixtures thereof.

Suitable relatively high molecular weight polyether polyols which can be employed herein include those which are prepared by reacting an alkylene oxide, halogen substituted or aromatic substituted alkylene oxide or mixtures thereof with an active hydrogen-containing initiator compound.

Suitable oxides include, for example, ethylene oxide, propylene oxide, 1,2-butylene oxide, 2,3-butylene oxide, styrene oxide, epichlorohydrin, epibromohydrin, mixtures thereof and the like.

Suitable initiator compounds include water, ethylene glycol, propylene glycol, butanediols, hexanediols, glycerine, trimethylol propane, pentaerythritol, hexanetriol, sorbitol, hydroquinone, resorcinol, catechol, bisphenols, novolac resins, phosphoric acid, mixtures thereof and the like.

Also suitable as initiators for the relatively high molecular weight polyols include, for example, ammonia, ethylenediamine, diaminopropanes, diaminobutanes, diaminopentanes, diaminohexanes, diethylenetriamine, ethanolamine, aminoethylethanolamine, aniline, 2,4-toluenediamine, 2,6-toluenediamine, diaminodiphenyloxide (oxydianiline), 2,4'-diaminodiphenylmethane, 4,4'-diaminodiphenylmethane, 1,3-phenylenediamine, 1,4-phenylenediamine, naphthylene-1,5-diamine, triphenylmethane-4,4',4''-triamine, 4,4'-di(methylamino)-diphenylmethane, 1-methyl-2-methylamino-4-aminobenzene, 1,3-diethyl-2,4-diaminobenzene, 2,4-diaminoesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3',5'-tetraethyl-4,4'-diaminodiphenylmethane and amine aldehyde condensation products such as the polyphenylpolymethylene polyamines produced from aniline and formaldehyde, mixtures thereof and the like.

Suitable polyester polyols which may be employed herein include, for example, those prepared by reacting a polycarboxylic acid or anhydride thereof with a polyhydric alcohol. The poly-carboxylic acids may be aliphatic, cycloaliphatic, aromatic and/or heterocyclic and may be substituted (e.g., with halogen atoms) and/or unsaturated. Example of carboxylic acids of this kind include succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids; such as oleic acid, which may be in admixture with monomeric fatty acids, terephthalic acid dimethyl ester; terephthalic acid bisglycol ester and the like. Mixtures of such acids or anhydrides may also be employed.

Examples of suitable polyhydric alcohols include ethylene glycol, 1,2-propylene glycol; 1,3-propylene glycol; 1,4-, 1,2- and 2,3-butylene glycol; 1,6-hexane diol; 1,8-octane diol; neopentyl glycol; cyclohexane dimethanol (1,4-bis-hydroxymethyl cyclohexane) 2-methyl-1,3-propane diol; glycerol; trimethylol propane; 1,2,6-hexane triol; 1,2,4-butane triol; trimethylol ethane; pentaerythritol; quinitol; mannitol; sorbitol; methyl glycoside; diethylene glycol; triethylene glycol; tetraethylene glycol; polyethylene glycol; dipropylene glycol; polypropylene glycols; dibutylene glycol; polybutylene glycols and the like. The polyesters may contain some terminal carboxyl groups. It is also possible to use polyesters of lactones such as caprolactone, or hydroxy carboxylic acids such as hydroxy caproic acid.

Other polyols which can be employed herein include polymer-containing polyols such as, for example, those disclosed in U.S. Pat. Nos. Re. 29,118 (Stamberger), Re. 28,715 (Stamberger), Re. 29,014 (Pizzini et al.) and 3,869,413 (Blankenship et al.) all of which are incorporated herein by reference.

In addition to those above-described polyols are the polymer/polyol blends which are normally liquid stable polymer/polyol compositions formed by polymerizing in the presence of a free radical catalyst from about 10 to about 50 weight percent of a mixture of an ethylenically unsaturated monomer such as acrylonitrile or styrene of mixtures thereof dissolved or dispersed in a polyol mixture.

Amine equivalents of the above described polyols and blends therewith are used in making polyurea and polyureaurethanes. Polyoxyalkylene polyamines and cyanoalkylated polyoxyalkylene polyamines having a molecular weight of 1000–10,000 with a preferred range of 2000 to 7000 which have the general formula:

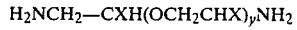
$$H_2NCH_2—CXH(OCH_2CHX)_yNH_2$$

where X is H or alkyl group having 1–18 carbon atoms and where y is a number of about 20–200; and triamines of polyalkoxylated trimethylol propane having the general formula:

$$CH_3CH_2C[CH_2(OCH_2—CHX)_zNH_2]_3$$

where z is an average of 10–100 are also useful materials for the blends of the invention. These amines are prepared according to the procedure outlined in a U.S. Pat. No. 3,666,788 the teachings of which are hereby incorporated by reference. These materials have the general formula:

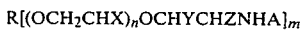
$$R[(OCH_2CHX)_nOCHYCHZNHA]_m$$

where R is the nucleus of an oxyalkylation-susceptible aliphatic polyhydric alcohol containing 2–20 carbon atoms and 2–6 hydroxyl groups, A is hydrogen or a cyano or lower alkyl radical having one or two carbon atoms between the nitrogen and cyano radical, Z is an alkyl group containing 1–18 carbon atoms, n has an average value 10–100 and m is 2–6, R is saturated and consists of carbon and hydrogen. The methyl and ethyl alkyl groups of A may be substituted by lower alkyl groups.

The blends may include lower molecular weight polyols and polyamines than those listed above.

The blends of this invention are made by forming a solution or dispersion of one or more polysiloxane mold release agent which consists essentially of 0.5-20 mol % of $R_aR'_bSiO_{[4-(a+b)]/2}$ units and from 99.5-80 mol % of $R''_cSiO_{(4-c)/2}$ units where R is an isocyanate reactive organic radical,
a has an average value of from 1-3,
R' and R'' are hydrocarbon radicals or substituted organic radicals,
b has an average value of 0-2,
a+b is from 1-3,
c has an average value from 1 to 3, and
wherein (d) the ratio of the total molecular weight to the total number of isocyanate reactive functional groups in the polysiloxane molecule (equivalent weight) ranges from 100-3500.

(e) the combined formula weights of all isocyanate reactive organic radicals, R do not exceed 40% of the total molecular weight of the polysiloxane mold release agent;

(f) the combined formula weights of all non-isocyanate reactive radicals, R'+R'' together do not exceed 40% of the total molecular weight of the polysiloxane mold release additive;

(g) the combined formula weights of all the organic radicals R+R'+R'' in the molecule together do not exceed 55-60% of the total molecular weight of the molecule;

(h) the polysiloxane mold release agent(s) each contain an average of at least two isocyanate reactive functional groups per molecule;

(i) at least two of the isocyanate reactive functional groups in each molecule are located on separate organic radicals, R, attached independently to different silicon atoms in the polysiloxane molecule;

(j) the isocyanate reactive functional groups which may be employed in the polysiloxane molecule(s) are restricted to the following types:
  (1) alcohols,
  (2) phenols,
  (3) thiols,
  (4) primary or secondary aromatic amines, which contain no oxygen, and have not more than one nitrogen atom attached directly to, in conjugation with, or incorporated within, the aromatic ring nucleus,
  (5) secondary aliphatic amines wherein at least one of the alkyl carbon atoms, bonded directly to the nitrogen atom, is not a primary carbon atom, The groups may be used independently or in any combination which is consistent with conditions listed above.

(k) the molecular weight of the polysiloxane mold release agent is between 1000 and 30,000, preferably 2000-15,000 and most preferred 4000-8000.

(l) the polysiloxane mold release agent(s) are substantially insoluble in liquid polyisocyanate especially those named hereinafter.

In these mold release agents the hydroxy, mercapto, or amino organic R radicals having preferably a molecular weight is the range of 100-400 can be attached to the silicon atom directly to carbon or through oxygen, nitrogen or sulfur carbon bonds. Particularly preferred R radicals are those of the formula HO—R'''—, $H_2N$—R'''—, HNR$_2$''', HS—R'''—, wherein R''' is a divalent linking group composed of carbon and hydrogen; carbon, hydrogen and oxygen; carbon, hydrogen and sulfur; carbon, hydrogen and nitrogen; or carbon, hydrogen, oxygen and nitrogen. Specific examples of R''' include the methylene, ethylene, propylene, hexamethylene, decamethylene, —CH$_2$CH(CH$_3$)—CH$_2$—, phenylene, butyl phenylene, naphthylene, —CH$_2$CH$_2$SCH$_2$CH$_2$—, —CH$_2$CH$_2$OCH$_2$—, —CH$_2$CH$_2$—CH$_2$—O(CH$_2$—CHR'O)$_n$—, where n is 0-5 where R' is described as above or H, a preferred R group is —CH$_2$CH$_2$CH$_2$O(CH$_2$CH(Ch$_3$)O)$_n$H where n=1-5. It is preferred that the R''' linking group contains from 3-10 atoms in addition to hydrogen atoms. There can be from 1-33 functional R radicals, preferably 3-10, and from 1-3 attached to a silicon atom.

As indicated above, the R' radical can be any hydrocarbon or substituted organic radical. Illustrative of the R' radicals that can be present are alkyl radicals such as the methyl, ethyl, propyl, butyl amyl, hexyl, octyl, decyl, dodecyl, and octadecyl, and myricyl radicals, alkenyl radicals such as the vinyl, allyl, and hexenyl radicals; cycloalkyl radicals such as the cyclobutyl and cyclohexyl radicals; aryl radicals such as the phenyl, xenyl and naphthyl radicals; aralkyl radicals such as the benzyl and 2-phenylethyl radicals; alkaryl radicals such as the tolyl, xylyl and mesityl radicals; the corresponding halohydro-carbon radicals such as 3-chloropropyl, 4-bromobutyl, 3,3,3-tri-fluoropropyl, chlorocyclohexyl, bromophenyl, chlorophenyl, alpha,alpha,alphatrifluorotolyl and the dichloroxenyl radicals; the corresponding cyanohydrocarbon radicals such as 2-cyanoethyl, 3-cyanopropyl and cyanophenyl radicals; the corresponding radicals such as ether and ester hydrocarbon radicals such as —(CH$_2$)$_3$OC$_2$H$_5$, —(CH$_2$)$_3$OCH$_3$, —(CH$_2$)$_3$COOC$_2$H$_5$, and (CH$_2$)$_3$COOCH$_3$, the corresponding thioether and thioester hydrocarbon radicals such as —(CH$_2$)$_3$SC$_2$H$_5$ and —(CH$_2$)$_3$COSCH$_3$; and nitrohydrocarbon radicals such as the nitrophenyl and 3-nitropropyl radicals. It is preferred that the R' radical be an organic radical containing from 1 to 10 atoms. In the most preferred embodiment of this invention at least 90% of all the R' radicals are methyl radicals. There can be an average of from 0 to 2 R' radicals attached to the silicon atom, i.e., b has an average of from 0 to 2 in the above formula.

The R'' radical in the functional isocyanate reactive siloxanes of this invention can also be any hydrocarbon or substituted hydrocarbon radical. The illustrative examples given with respect to R' above are equally applicable here and are not repeated for the sake of brevity. Likewise, the preferences set forth for R' above also apply to the R'' radical. There can be from 0 to 3 R'' radicals, on the average, per silicon atom, i.e., c has an average value of from 1 to 3 in the above formula.

These polysiloxane mold release agents are made by well known techniques and are usually formed by grafting an olefin containing organic modifying group or polyoxyalkylene oxide onto a "methylhydrogen siloxane" modified polydimethylsiloxane using a platinum catalyzed hydrolisation reaction.

The functional siloxanes of the mold release agent can be either solid or liquid in form and are required to be substantially insoluble in isocyanate liquid under RIM operating conditions. In order to use a solid functional siloxane it would be necessary to dissolve, disperse or suspend the siloxane in one or more silicone surfactants. Hence it is much preferred that the functional siloxane employed be in liquid form. While the viscosity of the liquid siloxane can vary over a wide range, for example from 1 to 100,000 cs., it is generally preferred that the viscosity be in the range of from 50 to 1000 cs. Molecular weight can vary from 1000 to 30,000, preferably 2000–20,000 and most preferred 4000–8000.

The amount of functional siloxanes of this invention incorporated into the polyurethane can vary from 0.25 to 5 percent by weight of the total polyurethane formulation. While the exact amount will necessarily be determined by individual process and manufacturing considerations, from 0.5 to 2 percent should satisfy most needs.

The present invention also provides a method for producing polyurethane products by reacting: (a) a polyol/polysiloxane mold release agent composition of this invention, (b) an organic polyisocyanate, and (c) a catalyst for the reaction of (a) and (b) to produce a polyurethane product and, when a foam is being prepared, a blowing agent. The polyol/polysiloxane may if desired be blended with conventional polyols or the like to reduce the polysiloxane content to a level required for the particular end use applications. Blends in which the resulting polysiloxane content is as low as 0.5 percent by weight of the total are useful.

The organic polyisocyanates that are useful in producing polyurethane products in accordance with this invention are organic compounds that contain at least two isocyanate groups. Such compounds are well known in the art. The preferred polyisocyanates used in the invention are aromatic derivatives which are liquids at room temperatures. Such materials are readily commercially available such as the isomers of toluenediisocyanate, diphenylmethane diisocyanate (MDI is an art recognized acronym for methylene diphenylisocyanate) and methylene bridged polyphenylmethane polyisocyanates. Many of the polyphenyl polymethylene polyisocyanates which are prepared by aniline formaldehyde condensations followed by phosgenation ("crude MDI") and polyisocyanates which contain carbodiimide groups, uretonimine groups, urethane groups, sulfonate groups, isocyanurate groups, urea groups or biuret groups and derivatives thereof containing minor amounts of pre-reacted low molecular weight polyols such as ethylene glycol and propylene glycol or hydroxy esters to form stable liquids are useful. Such combinations are readily available and well known in the urethane manufacturing art. Of particular interest to this invention are compositions containing the 2,4' and 4,4' diphenylmethane diisocyanate isomers which are quasi prepolymers containing about 10 weight % or about 0.1–0.3 mol percent of low molecular weight polyols such as propylene glycol, butylene, ethylene glycol and poly-1,2-propylene ether glycols having a molecular weight of from 134 to 700. Of additional interest to the invention are carbodiimide and uretonimine modified derivatives of diphenylmethane diisocyanates which have been further modified by the addition of high molecular weight polyols such as polyether diols and triols having a molecular weight of 1000–8000.

The preferred polyisocyanates used with the polyol blend of the invention are aromatic derivatives which are liquids at room temperatures. Such materials are readily commercially available such as the isomers of toluene diisocyanate, diphenylmethane diisocyanate and methylene bridged polyphenylmethane polyisocyanates.

Room temperature liquid derivatives of 2,4 and 4,4' diphenylmethane diisocyanate may contain carbodiimide groups, uretonimine groups, urethane groups, sulphonate groups, isocyanurate groups, urea groups or biuret groups and derivatives thereof containing minor amounts of prereacted low molecular weight polyols such as propylene glycol and butylene glycol or hydroxy esters to form stable liquids are useful.

Many of the polyphenyl polymethylene polyisocyanates which are prepared by aniline formaldehyde condensations followed by phosgenation (crude MDI) may be used and similar derivatives as described for 2,4 and 4,4' diphenylmethane diisocyanate together with mixtures of these.

Similar derivatives of toluene diisocyanate may be prepared and used alone or as mixtures with the 2,4 and 4,4' diphenylmethane diisocyanate derivatives.

Any known catalyst useful in producing polyurethanes may be employed. Representative catalysts includes (a) tertiary amines such as (dimethylaminoethyl)ether, triethylamine, tri-methylamine, N-methylmorpholine, N-ethylmorpholine, N,N-dimethyl-benzylamine, N,N-dimethylethanolamine, and the like; (b) tertiary phosphenes; (c) strong bases such as alkali or alkaline earth metal hydroxides and alkoxides; (d) acidic metal salts of strong acids such as ferric chloride, stannic chloride, bismuth nitrite and the like; (e) chelates of various metal such as those which can be obtained from acetylacetone, benzoylacetone, salisyl aldehydeamine and the like with various metals such as zinc, titanium, tin, iron, molybdinum and the like; (f) alcoholates of titanium, tin and aluminum and the like; (g) salts of organic acids with a variety of metal such as alkali metals, alkaline earth metals, aluminum, tin, lead, maganese, cobalt, nickel, and copper including for example, sodium acetate, stannus oleate, and maganese and cobalt naphthanate and the like; (h) organometallic derivatives of tetravalent tin, trivalent and pentavalent arsenic antamony and bismuth. Among such derivatives are most commonly used the dialkyltin salts of carboxylic acids such as dibutyltindiacetate, dibutyltindilaurate and the like.

The tertiary amines may be used as primary catalyst for accelerating the reactive hydrogen/isocyanate reaction or as secondary catalyst in combination with one or more of the above noted metal catalyst. Metal catalyst or combination of metal catalyst may also be employed as the accelerating agents without the use of the amines. Catalyst are employed in small amounts for example, from about 0.001 percent to about 5 percent based on the weight of the reaction mixture.

In addition the polyol/polysiloxane blend may contain minor amounts of chain extenders selected from high and low molecular weights of polyamines, such as diethyltoluene diamine, and low molecular weight glycol such as ethylene glycol, butane diol, propylene glycol, and glycerine.

It may be advantageous in some instances to reduce the specific gravity of the polyol or polyamine blend by the incorporation therewith of non-reactive gases such as nitrogen, air, carbon-dioxide, and the chlorofloromethane and ethane derivatives in concentrations ranging from 1–2 percent by volume. Such gases are incorporated with polyol employing conventional mechanical mixing procedures.

Polyols and polyamines useful in preparing the polysiloxane mold release blends of the invention can be demonstrated by but not limited to those in the following list some of which are well known in the art and are readily commercially available:

"Polyol A" is a polypropylene oxide triol (the designation of this and subsequent polyols as a "triol" or "diol" represents the nominal functionality based solely on the starter used; the actual functionality will be somewhat less) containing about 10% by weight of ethylene oxide end capping, and having a hydroxyl number of about 48 and a number average molecular weight of around 3300.

"Polyol B" is a polypropylene oxide diol containing about 15% ethylene oxide end capping, and having a hydroxyl number of about 38 and a number average molecular weight of around 3000.

"Polyol C" is a polypropylene oxide triol having a hydroxyl number of about 47, a number average molecular weight of about 3300, and containing about 14% ethylene oxide end capping.

"Polyol D" is a propylene oxide triol having a hydroxyl number of about 35, a number average molecular weight of around 4700, and containing about 15% ethylene oxide end capping.

"Polyol F" is a polypropylene oxide triol having a hydroxyl number of about 27, a number average molecular weight of about 6200, and containing approximately 15% ethylene oxide end capping.

"Polyol E" is a polypropylene oxide triol having a hydroxyl number of around 24, a number average molecular weight of about 7000, and containing approximately 14% ethylene oxide end capping.

"Polyol G" is a polypropylene oxide triol having a hydroxyl number of around 56, a number average molecular weight of about 2800, and containing approximately 8% ethylene oxide end capping.

"Polyol H" is a commercially available polyol known as Voranol 4702 (from Dow Chemical). This material is believed to be a polypropylene oxide/polyethylene oxide triol with a hydroxyl number near 34, and a number average molecular weight of around 4900.

"Polyol I" is a polypropylene oxide triol having a hydroxyl number of around 39, a number average molecular weight of about 4200, and containing approximately 17% ethylene oxide end capping.

"Polyol J" is a polypropylene oxide triol having a hydroxyl number of about 50, a number average molecular weight of around 3100, and containing approximately 10% ethylene oxide end capping.

"Polyol K" is a polypropylene oxide triol having a hydroxyl number of about 35, a number average molecular weight of around 4800, and containing approximately 18% ethylene oxide end capping.

"Polyol L" is a commercially available "polymer polyol" known as Niax-D-440 (from Union Carbide). This material is believed to be a polypropylene oxide/polyethylene oxide triol with a hydroxyl number of about 28, a number average molecular weight of around 6000, and containing about 20% by weight grafted polyacrylonitrile.

"Polyol M" is a polypropylene oxide triol having a molecular weight of around 10,000, a hydroxyl number of about 17, and containing approximately 15% ethylene oxide end capping.

"Polyol N" is a polypropylene oxide triol having a molecular weight of around 1000, a hydroxyl number of about 170, and containing approximately 25% ethylene oxide end capping.

"Polyol O" is a commercially available polyol known as Niax W-136 (from Union Carbide). This material is believed to be a polypropylene oxide/polyethylene oxide triol having a hydroxyl number of about 28, a number average molecular weight of about 6000.

"Polyol P" is a commercially available "polymer polyol" known as Niax D-442 (from Union Carbide). This material is believed to be a polypropylene oxide/polyethylene oxide triol with a hydroxyl number of around 24, a number average molecular weight of about 6400, and containing approximately 16% by weight of grafted polyacrylonitrile.

"Polyol Q" is a commercially available "polymer polyol" known as Niax 31-23 (from Union Carbide). This material is believed to be a polypropylene oxide/polyethylene oxide triol having an approximate hydroxyl number of 23, a number average weight of around 6900, and containing approximately 16% by weight of grafted polyacrylonitrile.

"Polyol R" is a commercially available polyol known as SF-5505 (from Texaco Chemical). This material is believed to be a propylene oxide/polyethylene oxide triol with a hydroxyl number of around 32, a number average molecular weight of about 5500.

"Polyol S" is a polypropylene oxide triol (formed by reacting trimethylolpropane with propylene oxide to a molecular weight of about 4500 and then further reacting with ethylene oxide to a final molecular weight of about 5300) having a hydroxyl number of around 32 and a viscosity of 900 centipoises at 25° C.

"Polyamine T" is a commercially available polypropylene oxide triamine known as Jeffamine T-3000 (from Texaco Chemical). This material is believed to have an equivalent weight of about 1000, a number average molecular weight of around 3000, and to be terminated with primary amino groups, i.e., these amino groups are located at the ends of the polyether chains.

"Polyamine U" is a commercially available polypropylene oxide triamine known as Jeffamine T-5000 (from Texaco Chemical). This material is believed to have an equivalent weight of around 1700, a number average molecular weight of about 5000, and to be terminated mostly with primary amino groups. These amino groups are located at the end of the polyether chains.

"Polyol/Polyamine Blend V" is a commercially available material known as Voranol XAS-10771 (from Dow Chemical).

"Isocyanate A" is a uretonimine modified liquid variant of 4,4'-diphenylmethane diisocyanate, with a free isocyanate content of 29.3%, and a viscosity of 40 cps at 25° C. Commercially available as Rubinate LF-168 (from Rubicon Chemical).

"Isocyanate B" is a quasiprepolymer modified liquid variant of 4,4'-diphenylmethane diisocyanate, with a free isocyanate content of 23.2% and a viscosity of 900 cps at 25° C. This quasiprepolymer is prepared using low molecular weight glycols and is available commercially as Rubinate LF-179 (from Rubicon Chemical).

"Isocyanate C" is a quasiprepolymer modified liquid variant of 4,4'-diphenylmethane diisocyanate formed by reacting "Isocyanate A" with "Polyol D" in a weight ratio of 4.3:1.0. This isocyanate quasiprepolymer has a free isocyanate content of 23.3% and a viscosity of about 200 cps at 25° C.

"Isocyanate D" is a quasiprepolymer modified liquid variant of 4,4'-diphenylmethane diisocyanate formed by reacting "Isocyanate A" with "Polyol R" in a weight ratio of 1:1. This isocyanate quasiprepolymer has a free isocyanate content of 13.5%.

"Isocyanate E" is a uretonimine modified quasiprepolymer of 4,4'-diphenylmethane diisocyanate. This product has a free isocyanate content of 26.3% and a viscosity of about 200 cps at 25° C. This product is commercially available as Rubinate LF-167 (from Rubicon Chemical).

"Isocyanate F" is a 38:19 (w/w) blend of "Isocyanate D" with "Isocyanate A".

The polysiloxane internal mold release agent containing blends of the invention can be made by any simple mixing procedure to provide a uniform dispersion of the polysiloxane mold release agent with the polyol or polyamine blend including other ingredients such as catalyst, chain extenders, fillers, stabilizers, coloring agents, and the like which are used in conventional formulations to prepare molded articles by the reaction injection molding technique. Such polyol blends may include up to about 50 percent by weight of conventional particulate and fiber fillers and reinforcing agents in addition to dyes and pigments.

The formulations of the invention include from 0.5–8 percent by weight of a polysiloxane such as those included in the above described definition and specifically but not limited to those in the following list having $R_aR'_bSiO_{[4-(a+b)]/2}$ units and $R''_cSiO_{[4-c]/2}$ units and wherein the value listed for (d) is the equivalent weight, (e) is the combined formula weights of reactive radicals R expressed as percent of the molecular weight, (f) is the combined formula weights of non-isocyanate reactive groups $R'+R''$ expressed as percent of the molecular weight:

"Polysiloxane I" is a hydroxy functional polysiloxane polyether copolymer internal mold release agent having the approximate formula:

$$(CH_3)_3SiO[Si(CH_3)_2O]_{66}[Si(CH_3)(C_3H_6O(CH_2CH(CH_3)O)_{2.5}H)O]_3Si(CH_3)_3$$

having a molecular weight of about 6000, a hydroxy equivalent weight (d) of 2000, (e) is 11%, (f) is 35%, and a viscosity of 160 centistokes.

"Polysiloxane II" is a hydroxy functional thioether copolymer internal mold release agent having the speculative formula:

$$[HOCH_2CH_2SCH_2CH_2(CH_3)_2SiO][Si(CH_3)_2O]_{70}[Si(CH_3)_2CH_2CH_2SCH_2CH_2OH]$$

having a hydroxy equivalent weight (d) of 2750, a molecular weight of 5500, a value for (e) of 4.3%, (f) is 39% and a viscosity of about 55 centistokes.

"Polysiloxane III" has a general formula as follows:

$$(CH_3)_3SiO[Si(CH_3)_2O]_{134}[Si(CH_3)(C_3H_6OC_2H_3(OH)CH_2OH)-O]_{16}Si(CH_3)_3$$

a molecular weight 13,136, (d) equivalent weight of 411, (e) is 16% and (f) is 33%.

"Polysiloxane IV" has a general formula as follows:

$$(CH_3)_3SiO[Si(CH_3)_2O]_{63}[Si(CH_3)(C_3H_6OC_2H_3(OH)CH_2OH)-O]_7Si(CH_3)_3$$

a molecular weight 6,154, (d) equivalent weight 440, (e) is 15%, and (f) is 34%.

"Polysiloxane V" has a general formula:

$$(CH_3)_3SiO[Si(CH_3)_2O]_{65}[Si(CH_3)(C_3H_6OC_2H_3(OH)CH_2OH)-O]_5Si(CH_3)_3$$

a molecular weight of 5918, (d) equivalent weight 592, (e) is 11%, and (f) is 34%.

"Polysiloxane VI" has a general formula:

$$(CH_3)_3SiO[Si(CH_3)_2O]_{56}[Si(CH_3)C_3H_6O(C_2H_3(OH)CH_2OH)O]_{14}Si(CH_3)_3$$

a molecular weight of 6980, (d) equivalent weight 249, (e) is 26%, and (f) is 28%.

"Polysiloxane VII" has a general formula:

$$CH_3CH(OH)CH_2OC_3H_6Si(CH_3)_2O[Si(CH_3)_2O]_{8.9}Si(CH_3)_2C_3H_6OC_2H_4(OH)CH_3$$

a molecular weight of 6962, (d) an equivalent weight of 3481, (e) is 3.4%, and (f) is 39%.

"Polysiloxane VIII" has a general formula:

$$(CH_3)_3SiO[Si(CH_3)_2O]_{66}[(CH_3)Si(C_4H_8-PH-NH(C_3H_7)O]_3Si(CH_3)_3$$

where PH=phenylene, a molecular weight of 5782, and equivalent weight (d) of 1927, (e) is 9.9% and (f) is 37%.

"Polysiloxane IX" has a general formula:

$$(CH_3)_3SiO[Si(CH_3)_2O]_{55}[HOCH_2CHOHCHOHCH(CH_2OH)CH(CH_2OH)Si(CH_3)O]_{14}Si(CH_3)_3$$

a molecular weight of 7550, an equivalent weight (d) of 108, (e) is 33% and (f) is 26%.

"Polysiloxane X" has a general formula:

$$(CH_3)_3SiO[Si(CH_3)_2O]_{61}[(CH_3)Si(C_3H_6OCH_2CH(OH)CH_2OH)O]_9Si(CH_3)_3$$

a molecular weight of 6390, an equivalent weight (d) of 355, (e) is 19% and (f) is 32%.

Polyol/Polysiloxane blends of the invention are demonstrated but not limited to the formulations listed in Table 1 wherein all proportions referred to are parts by weight.

TABLE 1

| Example | Polyol | (parts) | Polysiloxane | (parts) |
|---|---|---|---|---|
| 1 | L | 97 | I | 3 |
| 2 | A | 98 | I | 2 |
| 3 | A | 95 | I | 4 |
| 4 | K | 99.5 | I | 0.75 |
| 5 | D | 92.5 | II | 7.5 |
| 6 | G | 92.5 | II | 7.5 |
| 7 | B | 99.25 | II | 4.75 |
| 8 | M | 99.5 | IV | 0.5 |
| 9 | L | 96 | IV | 2.5 |
| 10 | K | 94 | IV | 6 |

Machine molding of RIM polyurethanes provides the only real method of assessing the efficiency of internal mold release agents and their effect on processing and properties.

Indications of improved mold release are provided by laboratory techniques wherein 4 mm thick 2.54 cm. × 15 cm. strips of conventional polyurethane RIM formulations are cast on a clean steel surface in a single layer, cured for 1 minute at 60° C. and thereafter peeled off with a metal clip attached to a spring balance. Castings containing no internal mold release have release values of from 800–1100 grams per inch while typical RIM formulations containing from 0.5–5 percent by weight of the mold release agents of the invention have mold release values substantially lower. For example, a RIM urethane formulation containing 2 percent of "Polysiloxane I" as provided for the polyol blend of Example 1 gives mold release value of 100 to 300 grams per inch.

While the laboratory peel strength is a good indication of the effectiveness of internal mold release agents there true worth can only be determined in actual commercial scale equipment in formulations employed in making complicated three dimensional shapes where large cured moldings must be pulled off directly from the mold surface. In the following example the use of the internal mold release polyol blends of the invention in commercial scale RIM application is best demonstrated.

The following examples were run on a standard two component Cinncinati Milacron RIM 90 machine equipped with a heated metal mold for forming an automobile fascia having a surface area of at about 2 sq. meters and 3.68 kilograms in weight. All proportions are expressed in parts by weight unless otherwise specified.

EXAMPLE 11

The polyurethane composition used represents a typical RIM two component system where the "A" component is "Isocyanate A". The "B" component is a mixture of a polyether polymer "Polyol L" with ethylene glycol as the chain extender and dibutyl tin dilaurate (Catalyst T-12-M and T Corp.) as the catalyst.

This system is designed to give a flexural modulus of 26,000 psi at 23° C.

| Component A | | |
|---|---|---|
| "Isocyanate A" | 55.8 pbw | |

| Component B | | Component B (with Internal Mold Release) |
|---|---|---|
| Polymer/Polyol "Polyol L" | 89.5 pbw | 89.5 pbw |
| Ethylene Glycol | 10.5 pbw | 10.5 pbw |
| Catalyst T12 | 0.15 pbw | 0.15 pbw |
| Polysiloxane "I" | | 3.2 pbw |

The temperature of the "A" component is maintained at 26° C. and the "B" component at 44° C.

The polyol or "B" component is nucleated with nitrogen under pressure to result in a molded density of 1.05.

The surface of the mold is pretreated with a conventional external mold release wax, XMR-136, supplied by Chem-Trend, Inc. The mold temperature is maintained at 68° C.

Components "A" and "B" are blended in an impingement mixer and dispensed directly into the mold, the cure time is 30 seconds. The mold is then opened and the molding removed. There must be no surface sticking or tearing of the polyurethane, the part should release without the need for undue force.

This formulation gave five releases before tearing or sticking occurred.

The addition of the polyol/polysiloxane blend of Example 1 increased the number of releases to thirty using the same conditions. The physical property data of Table 2 indicates that the siloxane mold release has little detrimental effect.

TABLE 2
PHYSICAL PROPERTIES IN FASCIA FORMULATION

| | Unfilled | | Filled |
|---|---|---|---|
| Milled Glass Content, % | 0 | 0 | 15 |
| Mold Release Content, % | 0 | 2 | 2 |
| Tensile Strength, psi | 3500 | 3400 | 3400 |
| Elongation at Break, % | 220 | 190 | 90 |
| Flexural Modulus, psi × 10³ | | | |
| 23° C. | 26 | 34 | 77 |
| −30° C. | 62 | 92 | 165 |
| 70° C. | 17 | 23 | 46 |
| Ratio −30/70 | 3.6 | 4.0 | 3.6 |
| Tear Strength, Die C, pli | 375 | 380 | 460 |
| Heat Sag, 250° F., in/hr. | | | |
| 4" | 0.2 | 0.2 | 0.1 |
| 6" | 1.0 | 0.8 | 0.3 |
| Number of Releases | 5–7 | >25 | >25 |

EXAMPLE 12

A series of fascia moldings were made as described in Example 11 with the exception that Polysiloxane I is blended with a different polymer/polyether polyol "Polyol P", and additional ethylene glycol. The polyurethane is a more rigid type having a flex modulus of 121,000 psi at 23° C.

| Component A | | |
|---|---|---|
| "Isocyanate A" | 95.2 pbw | |

| Component B | | Component B (with Internal Mold Release) |
|---|---|---|
| Polymer/Polyol "Polyol P" | 81.0 pbw | 81.0 pbw |
| Ethylene Glycol | 19.0 pbw | 19.0 pbw |
| Catalyst T12 | 0.1 pbw | 0.1 pbw |
| Catalyst DC-2 | 0.1 pbw | 0.1 pbw |
| Polysiloxane "I" | 0 | 2.0 pbw |

The temperature of the "A & B" Components were preheated to 26° C. and 62° C. respectively.

The formulation without mold release gave three releases without tearing or sticking while with the polysiloxane I in component B gave over 25 releases before sticking.

EXAMPLE 13

Example 12 was repeated using the polyol component "B" containing 30% by weight flaked glass to increase the flexural modulus to 300,000 psi.

The formulation without mold release gave two releases before sticking while that containing the polysiloxane "I"/polyol blend gave over twenty-five releases.

EXAMPLE 14

Using the equipment of Example 11 a series of low density fascias were made:

| Component A | | |
|---|---|---|
| "Isocyanate A" | 96.0 pbw | |
| Freon ® 11 (fluoro trichloromethane) | 4.0 pbw | |

| Component B | | Component B (with Internal Mold Release) |
|---|---|---|
| Polymer/Polyol "Polyol Q" | 85.0 pbw | 85.0 pbw |
| 1-4 Butane Diol | 15.0 pbw | 15.0 pbw |
| Dibutyl Tin Dilaurate | 0.075 pbw | 0.075 pbw |
| Polysiloxane "I" | 0 | 4.0 pbw |

The temperature of the "A" component was maintained at 22° C. and the "B" component at 60° C. The components were blended in an impingement mixer at a weight ratio of B/A of 1.7/1 and injected. The cure time was 60 secs. The series with mold release gave over 25 releases while only 4 without mold release.

EXAMPLE 15

Employing the equipment of Example 11, "Isocyanate A" as the "A" component, and a blend of 100 parts "polyether polyol/diamine blend V", 17 parts ethylene glycol, 3.6 parts polysiloxane "I", dibutyl tin dilaurate and tin catalyst UL-28 as the "B" component a series of fascias were molded. The temperature of the "A" component was 24° C., the "B" component 49° C. The "B" component was nucleated with nitrogen to result in a molded density of 1.05. Components "A" and "B" were impingement mixed at A/B ratios of 0.757/1 to yield a polyurethane with an isocyanate index of 104. The mix was injected immediately and cured in 60 secs. The formulation gave over 30 releases before sticking in the mold.

EXAMPLE 16

The procedure of Example 15 was repeated and included 25% by weight of flaked glass in the "B" component. The ratio of A/B through the impingement mixer was 0.578 to yield a polyurethane with an isocyanate index of 104. The formulation gave over 30 releases before sticking occured.

EXAMPLE 17

The procedure of Example 16 was repeated wherein 35% flaked glass was included in the "B" component. The ratio A/B through the impingement mixer was 0.736/1 to yield a polyurethane stoichiometry index of 104. Over 30 releases were obtained before sticking occured. Only five releases were obtained without the internal mold release.

EXAMPLE 18

A series of fascias were made employing the equipment of Example 11 using a system to give a flexural modulus of 36,000 psi at 23° C.

|  | Component "A" |
| --- | --- |
|  | "Isocyanate B" - 58.2 pbw |
|  | Component "B" |
| 100 | "Polyol O" |
| 22.5 pbw | Diethyl toluene diamine |
| .15 pbw | Catalyst T-12 (dibutyl Tin dilaurate) |
| 4.0 pbw | Polysiloxane "I" mold release |

The surface of the mold was treated with external mold release Rimlease ®1535. The mold temperature was 54° C. The "A" and "B" components were preheated to 26° C. and 38° C. respectively. The "B" component was nucleated with nitrogen under pressure to result in a molded density of 1.05.

The "B" component with siloxane containing material gave 12 releases without sticking while the untreated "B" component gave two. The physical properties were unaffected by the inclusion of mold release.

EXAMPLE 19

Example 18 was repeated with the inclusion of 15% milled glass in the total formulation and yielded the same improvement in mold release.

EXAMPLE 20

| Component A | |
| --- | --- |
| "Isocyanate C" | 105 pbw |
| Freon ® 11 | 3.1 pbw |
| 1. Component B (Control) | |
| "Polyol L" | 84.4 pbw |
| Ethylene glycol | 15.6 pbw |
| N—Methyl Diethanolamine | 0.4 pbw |
| Union Carbide Surfactant L-5304 | 1.0 pbw |
| Catalyst T-12 | 0.12 pbw |
| 2. Component B (With Polysiloxane I) | |
| "Polyol L" | 84.4 pbw |
| Ethylene Glycol | 15.6 pbw |
| N—Methyl Diethanolamine | 0.4 pbw |
| Union Carbide Surfactant L-5304 | 1.0 pbw |
| Catalyst T-12 | 0.12 pbw |
| Polysiloxane I | 2.1 pbw |

A series of facia moldings were made, as described in Example 11, using the A component listed above with each of the three B components 1 and 2.

The control B component 1, gave only 5 releases; B component 2, with polysiloxane I, gave 25 releases before sticking and tearing of parts occurred within the cavity of the facia mold. The physical property data of Table 3 indicates that the siloxane mold release agent I has very little detrimental effect.

TABLE 3[a]

| Property | Control | Siloxane I |
| --- | --- | --- |
| % Elongation | 168 | 158 |
| Heat Sag (250° F., 6 in.) (in) | 0.93 | 0.86 |
| Tear res. lb/1.in | 498 | 481 |
| Tensile Str. | 4102 | 4366 |
| Flex Modulus × $10^3$ (psi) | | |
| −20° F. | 137 | 114 |
| 73° F. | 47.4 | 47.6 |
| 158° F. | 21.9 | 22.4 |
| Shrinkage % | 1.13 | 1.42 |
| Specific Gravity | 1.05 | 1.06 |
| Releases Obtained | 5 | 25 |

[a]Samples were postcured 1 hour at 248° F. and then aged at ambient temperatures for 7 days before testing.

EXAMPLE 21

According to the procedures of Example 11 a series of fascias were made. The component "A" was 89.0 pbw "Isocyanate E".

| Component "B" | |
| --- | --- |
| 100 pbw | "Polyol S" |
| 15 pbw | ethylene glycol |
| 0.05 pbw | dibutyltin dilaurate catalyst |
| 0.7 pbw | DABCO 33LV catalyst (triethylene diamine) |
| 3.4 pbw | polysiloxane I mold release. |

Over twenty-five moldings were made before sticking occured. Physical properties were not effected.

EXAMPLE 22

Employing the polyol/polysiloxane blend of Example 9, ethylene glycol and "Isocyanate A" several 4 mm thick castings on clean steel surfaces were made. Values of low mold release of 90–120 grams per inch indicate that most excellent mold release may be obtainable even without the application of external mold release coatings.

EXAMPLE 23

Improved mold releasable polyurea compositions giving over 25 release can be expected by impingement mixing a polyamine "B" component containing 62.3 parts "Polyamine T", 18.9 parts diethyltoluene diamine, 1 part "Polysiloxane I" and "Isocyanate F" as the A component at an isocyanate index of 1.04, in a mold at 62° C.

What is claimed is:

1. A liquid blend for use in preparing reaction injected molded polyurethane, polyurea and polyureaurethane resins having improved mold release properties which comprises at least one organic polyol and/or polyamine having 2 to 6 isocyanate reactive groups and a molecular weight of 1,000–10,000 having dispersed therein from 0.5–8.0 percent by weight of a polysiloxane mold release agent which consists essentially of 0.5–20 mol percent of $R_aR'_bSiO_{[4-(a+b)]/2}$ units and from 80–99.5 mol percent of $R''_cSiO_{(4-c)/2}$ units where R is an isocyanate reactive organic radical, a has an average value of from 1–3, R' and R'' are both non-isocyanate reactive organic radicals, b has an average value of 0–2, a+b is from 1–3, and c has an average value of from 1–3, wherein the ratio of the total molecular weight of said polysiloxane mold release agent to the total number of isocyanate reactive functional groups in said polysiloxane mold release agent ranges from 100–3500, the combined formula weights of all isocyanate reactive organic radicals, R do not exceed 40% of the total molecular weight of said polysiloxane mold release agent, the combined formula weights of all non-isocyanate reactive radicals, R'+R'' together do not exceed 40% of the total molecular weight of said polysiloxane mold release additive.

the combined formula weights of all the organic radicals R+R'+R'' in the molecule together do not exceed 60% of the total molecular weight of the molecule, said polysiloxane mold release agent contains an average of at least two isocyanate reactive functional groups per molecule, at least two of the isocyanate reactive functional groups in each molecule are located on separate organic radicals, R, attached independently to different silicon atoms in said polysiloxane, said isocyanate reactive functional groups (R) are selected from the group consisting of alcohols, phenols, thiols, primary or seecondary aromatic amines, which contain no oxygen, and not more than one nitrogen atom attached directly to, in conjugation with, or incorporated within, the aromatic ring nucleous, and secondary aliphatic amines wherein at least one of the alkyl carbon atoms, bonded directly to the nitrogen atom, is not a primary carbon atoms, the molecular weight of said polysiloxane mold release agent ranges from 1000 to 30,000, and said polysiloxane mold release agent being substantially insoluble in liquid organic isocyanates.

2. A composition of claim 1 wherein said polysiloxane has a molecular weight of 2000–15,000.

3. A composition of claim 1 wherein said polysiloxane has a molecular weight of 4000–8000.

4. A composition of claim 1 wherein said polysiloxane has a viscosity of 1–100,000 centistokes.

5. A composition of claim 1 wherein R, R', and R'' are organic radicals attached to silicon by carbon to silicon bonds, by carbon oxygen silicon bonds, or by carbon sulfur silicon bonds.

6. A composition of claim 1 wherein R is selected from the group consisting of R'''—OH, R'''—CHOHCH$_2$OH, R'''—CHOHCH$_3$, R'''—SH, or R'''—CH$_2$SH; wherein R''' is a divalent linking group composed of carbon and hydrogen, carbon hydrogen and oxygen, carbon hydrogen and sulfur, or carbon hydrogen oxygen and sulfur.

7. A composition of claim 1 wherein R is 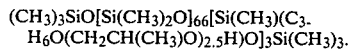 where n=1–5.

8. A composition of claim 7 having a hydroxyl equivalent weight of between 500 and 2,500.

9. A composition of claim 7 wherein said polysiloxane has the general formula:

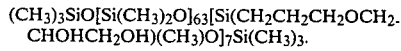

10. A composition of claim 1 wherein said polysiloxane has the general formula:

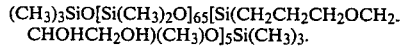

11. A composition of claim 1 wherein said polysiloxane has the general formula:

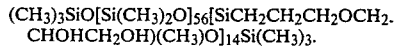

12. A composition of claim 1 wherein said polysiloxane has the general formula:

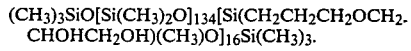

13. A composition of claim 1 wherein said polysiloxane has the general formula:

(CH$_3$)$_3$SiO[Si(CH$_3$)$_2$O]$_{134}$[Si(CH$_2$CH$_2$CH$_2$OCH$_2$CHOHCH$_2$OH)(CH$_3$)O]$_{16}$Si(CH$_3$)$_3$.

14. A composition of claim 1 wherein R is

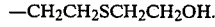

15. A composition of claim 1 wherein said polyol consists essentially of the reaction product of a low molecular weight polyol or polyamine having 2 to 6 active hydrogens with an alkoxylating agent selected from the group consisting of ethylene oxide and propylene oxide.

16. A composition of claim 15 wherein said low molecular weight polyol is selected from the group consisting of 1,3-dihydroxypropane, 1,3-dihydroxybutane, 1,4-dihydroxybutane, 1,4-, 1,5- and 1,6-dihydroxyhexane, 1,2-, 1,3-, 1,4-, 1,6-, and 1,8-dihydroxyoctane, 1,10-dihydroxydecane glycerine, 1,2,4-tri-hydroxybutane, 1,2,6-trihydroxyhexane, 1,1,1-trimethylolethane, 1,1,1-trimethylolpropane, pentaerithitol, caprolactone, polycaprolactone, sylitol, aribitol, sorbitol, and mannitol.

17. A composition of claim 15 when made by first reacting the low molecular weight polyol with propylene oxide and thereafter with ethylene oxide.

18. A composition of claim 15 when said polyol is first reacted with ethylene oxide and thereafter propylene oxide.

19. A composition of claim 15 wherein said low molecular weight polyol is reacted with a homogeneous mixture of ethylene oxide and propylene oxide.

20. A process of reaction injection molding which includes the mixing of an organic isocyanate with one or more of the following: polyols, polyamines, chain extenders, catalysts, blowing agents, surfactants, and curing of the foregoing ingredients in a metal mold, the improvement comprising including a polysiloxane mold release agent, as described in claim 1, with said polyol and/or polyamine.

21. A composition of claim 1 wherein said polyamine is a primary and/or secondary amine terminated polyether.

22. A compositions of claim 21 wherein said polyamine also contains hydroxy groups and wherein the total average number of isocyanate reactive grouups per molecule (amines and hydroxy groups) is between 2 and 6, inclusive.

23. A composition of claim 1 wherein said polyol also contains primary and/or secondary amine groups and wherein the total average number of isocyanate reactive groups per molecule (hydroxyl groups and amines) is between 2 and 6, inclusive.

24. A composition of claim 1 which further comprises one or more chain extenders.

25. A composition of claim 24 wherein said chain extenders are selected from the group consisting of organic diamines, diols, or amino alcohols with molecule weights below 500.

26. A composition of claim 25 wherein the chain extender is ethylene glycol.

27. A composition of claim 25 wherein the chain extender is an aromatic diamine with a molecular weight under 400.

* * * * *